United States Patent [19]
Takemura et al.

[11] Patent Number: 4,605,500
[45] Date of Patent: Aug. 12, 1986

[54] HOLLOW-FIBER FILTER MODULE

[75] Inventors: Tohru Takemura, Ohtake; Haruhiko Yoshida, Kuga; Takuma Mukai; Hiroshi Takahashi, both of Ohtake; Yoshikazu Fujinaga, Toyohashi, all of Japan

[73] Assignee: Mitsubishi Rayon Co., Ltd., Tokyo, Japan

[21] Appl. No.: 719,237

[22] Filed: Apr. 2, 1985

[30] Foreign Application Priority Data

Apr. 24, 1984 [JP] Japan ............................ 59-59330[U]
Apr. 25, 1984 [JP] Japan ............................ 59-59873[U]
Jun. 1, 1984 [JP] Japan ................................ 59-110943

[51] Int. Cl.[4] ...................... B01D 13/00; B01D 31/00
[52] U.S. Cl. ............................ 210/321.1; 210/321.3; 210/433.2; 210/450
[58] Field of Search ............... 210/500.2, 321.1, 321.2, 210/321.3, 321.4, 321.5, 433.2, 232, 450

[56] References Cited
FOREIGN PATENT DOCUMENTS 56-46881 11/1981 Japan .

Primary Examiner—Frank Sever
Attorney, Agent, or Firm—Oblon, Fisher, Spivak, McClelland & Maier

[57] ABSTRACT

The present invention discloses a hollow-fiber filter module comprising (a) an annular member, (b) a filter membrane consisting of a large number of hollow fibers, (c) a fastening member attached to the inside surface of the annular member for bundling and fixing the hollow fibers in a U-shaped pattern with their both ends left open, (d) a supporting member consisting of a plurality of supporting pillars or a cylinder, said supporting member being joined to said annular member and extending along the U-shaped portions of the hollow fibers, and (e) a hollow fiber retaining member joined to the supporting member and extending through the space enclosed in the U-shaped portions of the hollow fibers. This hollow-fiber filter module is suitable for use in water purifiers for treating large volumes of water containing minute colloidal particles and can be efficiently regenerated by gas bubble treatment to restore its filtering function.

5 Claims, 11 Drawing Figures

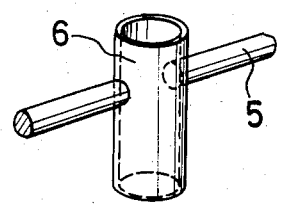
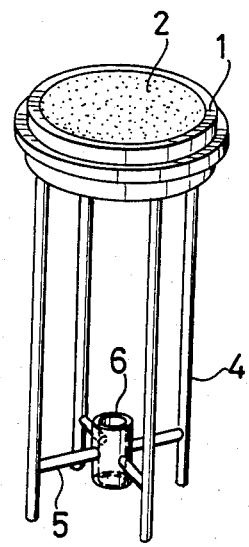
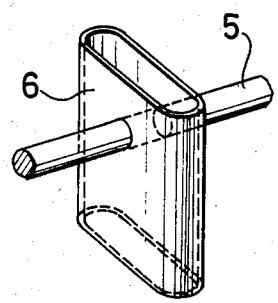
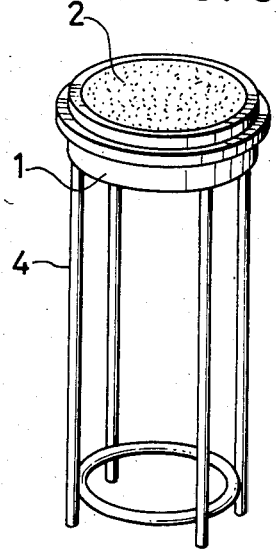
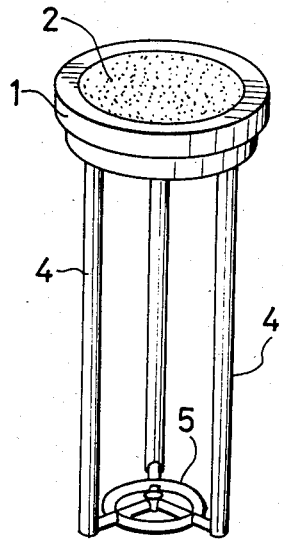
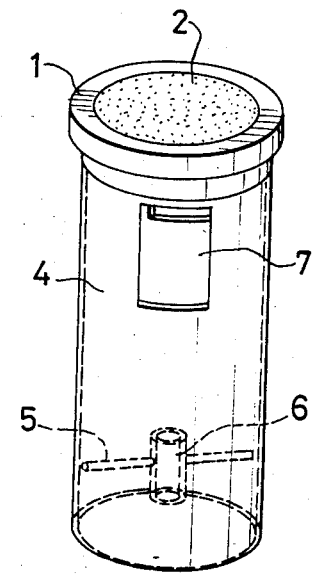

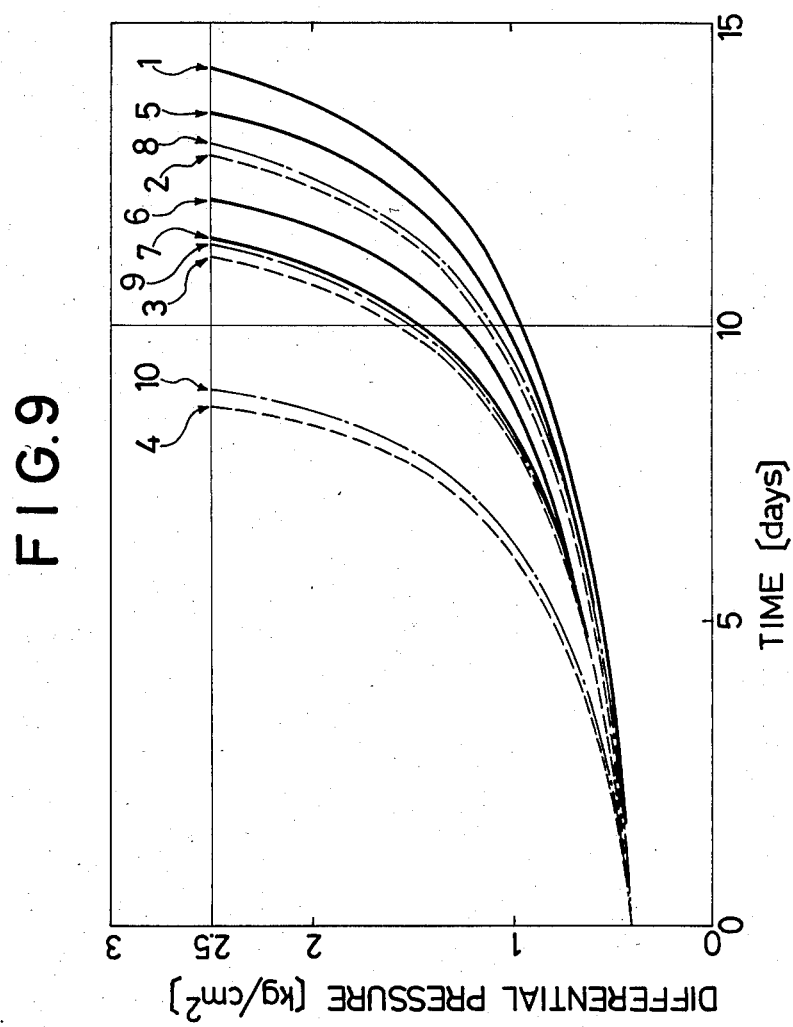

HOLLOW-FIBER FILTER MODULE

BACKGROUND OF THE INVENTION

1. Field of the Invention

This invention relates to a hollow-fiber filter module for use in water purifiers. More particularly, it relates to a follow-fiber filter module suitable for use in water purifiers for treating relatively large volumes of water (e.g., feed water for nuclear power plants) containing metal ions and minute colloidal particles.

2. Description of the Prior Art

In conventionally known water purifiers for removing iron rust and suspended matter in water, an ultrafilter has typically been used. However, this filter is liable to clogging. Moreover, there is a limit on the size of the particles removable by such water purfiers and it is impossible to remove metal ions.

For example, steam condensate recovered from the turbines of a nuclear power plant using a boiling water reactor contains about 15 parts per billion (ppb) of impurities such as iron ions and minute colloidal particles. If this condensate is directly recycled to the reactor, the aforesaid impurities will coagulate and deposit in the reactor, causing a reduction in the efficiency of power generation. Accordingly, it is necessary to purify the condensate to an impurity concentration of about 0.5 ppb or less before recycling it to the reactor.

Where it is desired, as described above, to remove the impurities contained in steam condensate (i.e., very minute colloidal particles, metal ions and the like) with high efficiency, water purification equipment using a reverse-osmotic membrane is suitably employed in ordinary water treatment applications. However, the equipment using a reverse-osmotic membrane tends to require very high pressures for purposes of filtration and, therefore, must be large-sized. Thus, such equipment has been unsuitable for use as a filter module in the treatment of steam condensate recovered from, for example, nuclear power plants because such treatment must be carried out in a closed system.

On the other hand, porous filter membranes in the form of hollow fibers have excellent water-purifying capacity, but tend to become clogged when used in applications where it is desired to treat large volumes of water containing relatively large amounts of minute colloidal particles, metal ions and the like. Since it is difficult to rid the membrane of this clogged condition and restore its filtering function, they have seldom been used. Furthermore, in the existing state of the art concerning the treatment of circulating water for nuclear power plants, it is still desirable to develop a filter module which is practically useful not only from the viewpoint of capacity but also from the viewpoints of economy, maintenance and waste disposal.

SUMMARY OF THE INVENTION

It is an object of the present invention to provide a hollow-fiber filter module suitable for purifying large volumes of water containing relatively large amounts of metal ions and very minute colloidal particles.

It is another object of the present invention to provide a hollow-fiber filter module which permits a backwashing process for restoring the filtering function of the clogged filter membrane to be easily carried out without removing the module from the water purification equipment.

According to the present invention, there is provided a hollow-fiber filter module comprising (a) an annular member, (b) a filter membrane consisting of a large number of hollow fibers, (c) a fastening member attached to the inside surface of the annular member for bundling and fixing the hollow fibers in a U-shaped pattern with their both ends left open, (d) a supporting member consisting of a plurality of supporting columns or a cylinder, the supporting member being joined to the annular member and extending along the U-shaped portions of the hollow fibers, and (e) a hollow fiber retaining member joined to the supporting member and extending through the space enclosed in the U-shaped portions of the hollow fibers.

The aforesaid hollow fiber retaining member is preferably provided with a tubular spacer which is disposed so as to be parallel to the supporting member.

BRIEF DESCRIPTION OF THE DRAWINGS

FIGS. 1a and 1b schematically illustrate one embodiment of the hollow-fiber filter module of the present invention, FIG. 1a being a perspective view (with the hollow fibers not shown) and FIG. 1b being a sectional view taken along line A—A of FIG. 1a;

FIGS. 3 and 4 are enlarged partial perspective views illustrating several embodiments of the neighborhood of the hollow fiber retaining member and the tubular spacer included in the hollow-fiber filter module of the present invention;

FIGS. 5 to 8 are schematic perspective views illustrating still other embodiments of the hollow-fiber filter module of the present invention (with the hollow fibers not shown in any of these figures); and FIG. 9 is a graph showing the changes in differential pressure with time as observed when filtration was carried out by using various hollow-fiber filter modules.

DETAILED DESCRIPTION OF THE PREFERRED EMBODIMENTS

The hollow-fiber filter module of the present invention will be more specifically described hereinbelow with reference to the accompanying drawings.

Figure 1A:
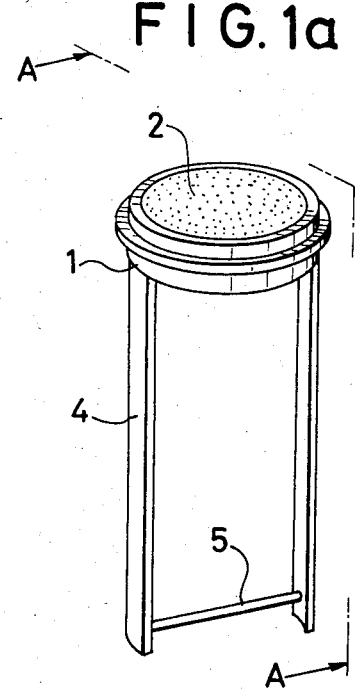
Figure 1B:
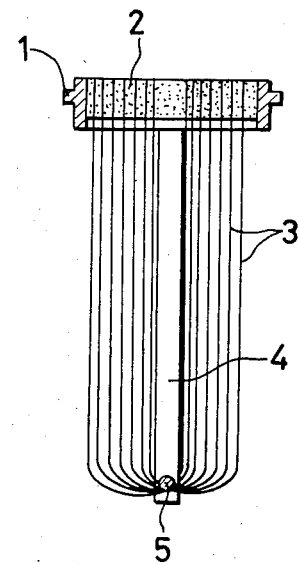

FIGS. 1a and 1b schematically illustrate one embodiment of the hollow-fiber filter module of the present invention. As shown in these figures, the hollow-fiber filter module of the present invention is basically composed of an annular member 1, a fastening member 2, hollow fibers 3 bundled and fixed in a U-shaped pattern, a supporting member (or supporting pillars) 4 and a hollow fiber retaining member 5.

The annular member 1 functions as a support member which, in setting the hollow-fiber filter module in a water purifier, serves to support the entire module. This annular member 1 is typically in the form of a ring, but may have a rectangular or other cross-sectional shape. Moreover, its outer periphery may have any of various shapes according to the manner in which the module is set in the water purifier. To the inside surface of this annular member 1 is joined a fastening member 2 which fixes hollow fibers 3 and serves as a partition between the water to be purified and the resulting purified water in order to allow the hollow fibers to function as a filter membrane. By the fastening member 2, a large number of hollow fibers 3 are bundled and fixed in a U-shaped pattern with their both ends left open. Generally, the fastening member 2 is made of a material such as polyurethanes, unsaturated polyesters, epoxy resins or silicone resins. To the annular member 1 are joined two supporting pillars 4 which are positioned in such a way that they extend along the U-shaped portions of the hollow fibers 3 on the outside of the bundle of hollow fibers and they are substantially parallel to each other. The supporting pillars 4 may have any of various cross-sectional shapes typified by circular arcs, circles, rectangles and the like. However, it is preferable that the supporting pillars 4 have no sharp edge so as not to damage the hollow fibers 3 upon contact. To the lower end or an intermediate point of these supporting pillars 4 is joined a hollow fiber retaining member 5 which extends through the space enclosed in the U-shaped portions of the hollow fibers 3 (as shown in FIG. 1b) and thereby serves to hold the hollow fibers 3 in a U-shaped pattern at all times.

Figure 2A:
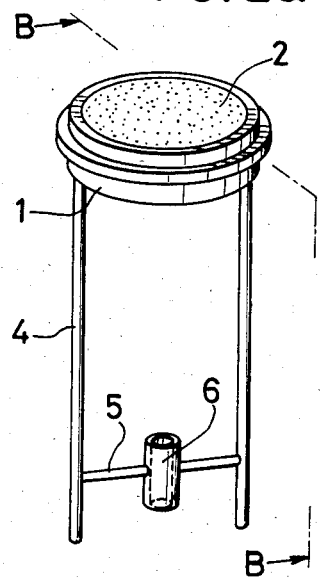
FIGS. 2a and 2b are schematic views similar to FIGS. 1a and 1b, illustrating another embodiment of the hollow-fiber filter module of the present invention.
Figure 2B:
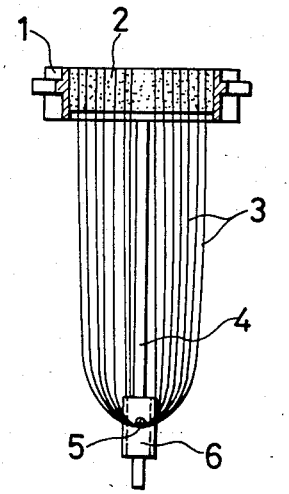

FIGS. 2a and 2b are schematic views illustrating another embodiment of the hollow-fiber filter module of the present invention. In this embodiment, a tubular spacer 6 is joined to about the center of the hollow fiber retaining member 5 in such a way that it is parallel to the aforesaid supporting pillars. As the tubular spacer 6, there may be used any of various tubular members. Its cross-sectional shape is not restricted to circles, but can be any of various shapes such as ellipses, round-cornered polygons and the like. Moreover, the tubular spacer 6 can also comprise a funnel-shaped tube positioned with its thinner end facing the annular member 1. Alternatively, this funnel-shaped tube may be positioned invertedly, i.e., with its thicker end facing the annular member 1.

FIGS. 3 and 4 are enlarged partial perspective views illustrating several embodiments of the neighborhood of the hollow fiber retaining member 5 and the tubular spacer 6 included in the hollow-fiber filter module of the present invention. As shown in FIG. 4, an embodiment is possible in which the hollow fiber retaining member 5 extends through the tubular spacer 5 and thereby fixes it. The size of the tubular spacer 6 cannot be generally defined because it should be properly determined depending on the size of the hollow-fiber filter module. However, it is suitable that the internal cross-sectional area of the tubular spacer 6 is not less than 1/50 the internal cross-sectional area of the annular member 1. The length of the tubular spacer 6 should preferably be such that its lower end protrudes slightly from the bundle of hollow fibers 3 arranged in a U-shaped pattern and its upper end permits gas bubbles to be introduced into the inner, central part of the bundle of hollow fibers 3. In contrast to the hollow fiber retaining member 5, the tubular spacer 6 does not have the function of retaining the U-shaped pattern of the hollow fibers 3. It is preferable that, like the aforesaid supporting pillars 4, the hollow fiber retaining member 5 and the tubular spacer 6 also have cross-sectional shapes with no sharp edge.

The number of the supporting pillars 4 is not restricted to two as shown in FIGS. 1a and 2a, but can be three or more. In embodiments including the tubular spacer 6, the hollow fiber retaining member 6 may be branched in such a way that its branches extend from the tubular spacer 6 in three or more radial directions. FIG. 5 illustrates one such embodiment in which the hollow fiber retaining member 5 has four branches extending in four radial directions.

The number of branches of the hollow fiber retaining member 5 may be properly determined according to the overall shape and size of the hollow-fiber filter module, the strength thereof, the number of hollow fibers used, and the like.

Moreover, the hollow fiber retaining member 6 may include an annular part as shown in FIGS. 6 and 7. Where the hollow fiber retaining member 6 includes an annular part, the bundle of hollow fibers arranged in a U-shaped pattern can be distributed in a dispersed manner along with the annular part of the hollow fiber retaining member. Thus, since the openings between the hollow fibers are enlarged compared to the case using rod-like hollow fiber retaining member such as shown FIGS. 1a, 5 and 8, gas bubbles can be supplied to a far greater number of hollow fibers and the hollow fibers can be vibrated effectively during gas bubble treatment. In addition, since the center vacant space defined by the annular hollow fiber retaining member provide a similar function to the tubular spacer, there is no particular need to provide a tubular spacer and the structure of the hollow-fiber filter module can be simplified.

All of the components constituting the hollow-fiber filter module of the present invention (i.e., the annular member, the supporting member, the hollow fiber retaining member and the tubular spacer) are preferably made of a hydrocarbon resin which can be burned up without evolution of harmful gases. The hollow fibers 3 used as the filter membrane may comprise hollow fibers made of various materials including, for example, cellulosics, polyolefins, polysulfones, polyvinyl alcohol and PMMA. However, hollow fibers made of a porous polyolefin membrane are preferred because of their excellent durability and filtering performance. Especially preferred are hollow fibers made of a membrane which is suitable for the purpose of filtering off minute colloidal particles and can withstand the external force exerted by backwashing commonly employed as a regeneration process for restoring the filtering function of the clogged filter membrane. Examples of such hollow fibers include polyethylene hollow fibers commercially available from Mitsubishi Rayon Co., Ltd. under the trade name of Polyethylene Hollow Fibers EHF.

Where the hollow-fiber filter module of the present invention is used in applications involving the necessity of treating large volumes of water containing relatively large amounts of colloidal particles, it is unavoidable that the filter membrane becomes clogged. However, in the hollow-fiber filter module of the present invention, a regeneration process can be simply and efficiently carried out to restore its initial performance. A preferred regeneration process comprises passing a water current in the opposite direction to tht employed in the filtration process and, at the same time, blowing a gas in from the bottom of the module to bombard the hollow fibers 3 with gas bubbles, give mechanical vibrations to the hollow fibers 3 and thereby shake off the colloidal particles and other impurities coagulated and attached to the surfaces of the hollow fibers 3. However, if conventional hollow-fiber fiter modules are subjected to such a regeneration process by gas bubble treatment, the tubulence of the liquid occurring under the influence of gas bubbles may cause the hollow fibers 3 to become entangled with one another, resulting in an impairment of their filtering function. In an extreme case, a serious situation may result in which such entanglement causes damage to some of the hollow fibers 3 and they can no longer function as a filter membrane.

However, since the hollow-fiber filter module of the present invention is provided with the hollow fiber retaining member 5 which is joined to the supporting pillars 4 and serves to hold the hollow fibers in a U-shaped pattern, the U-shaped arrangement of the hollow fibers 3 is not disturbed to an undue extent during the regeneration process by gas bubble treatment. Moreover, gas bubbles can be allowed to penetrate relatively uniformly into the interior of the bundle of hollow fibers 3, so that the regeneration process for restoring the filtering function of the hollow fibers 3 can be carried out efficiently. Furthermore, the hollow fiber retaining member 5 joined to the supporting pillars 4 also serves to prevent the hollow fibers 3 from rising under the influence of the water current during the filtration process and to protect the hollow fibers 3 from premature deterioration due to excessive flexural fatigue. Still further, where the hollow-fiber filter module of the present invention including the tubular spacer 6 is subjected to the aforesaid regeneration process for restoring the filtering function of the hollow fibers 3 by gas bubble treatment, the tubular spacer 6 allows gas bubbles to pass therethrough and reach the inner, central part of the bundle of hollow fibers 3 arranged in a U-shaped pattern. This permits not only the outer layer but also the inner part of the bundle of hollow fibers 3 to be bombarded with gas bubbles, so that the regeneration process can be carried out more rapidly and more effectively.

FIG. 8 is a schematic perspective view illustrating still another embodiment of the hollow-fiber filter module of the present invention. In this figure, the hollow fibers are not shown again. In this embodiment, the supporting member 4 consists of a cylinder, and the hollow fiber retaining member 5 having the tubular spacer 6 is joined to the lower, inside surface of the cylindrical supporting member 4. This cylindrical supporting member 4 not only serves as a support for fixing the hollow fiber retaining member 5, but also has the function of protecting the hollow fibers 3 from damage during the period of storage or transport between the manufacture and practical use of the hollow-fiber filter module. It is to be understood that, although the annular member 1 and the cylindrical supporting member 4 are separately formed in this embodiment, they may also be formed as an integral structure. In addition, an aperture 7 is provided in a region of the cylindrical supporting member 4 close to the annular member 1 so as to prevent gas bubbles from accumulating in the interior of the hollow-fiber filter module during the aforesaid regeneration process by gas bubble treatment and discharge such gas bubbles out of the module. This aperture 7 may have any desired size, provided that it permits the air bubbles introduced into the cylindrical supporting member 4 to be easily discharged. However, it is suitable to make the resistance to flow through the aperture 7 practically negligible. Thus, the size of the aperture 7 should desirably be equal to or large than the internal cross-sectional area of the cylindrical supporting member 4.

In the hollow-fiber filter module of the present invention, the installation density of the hollow fibers 3 bundled and fixed by the fastening member 2 [more exactly speaking, the ratio (R) of the overall cross-sectional area (Sf) of all hollow fibers 3 (inclusive of their bores) embedded in the fastening member 2 to the internal cross-sectional area (Sr) of the annular member 1 when the annular member 1 is sectioned in a direction perpendicular to the hollow fibers 2] should preferably satisfy the following condition:

$$0.11 \leq R \; (=Sf/Sr) \leq 0.60$$

If the installation density (R) of the hollow fibers is unduly high, it may be difficult to construct the hollow-fiber filter module in such a way that all interstices between the hollow fibers are filled with the material of the fastening member and, therefore, the fastening member may fail to function as a partition. This naturally places an upper limit on the value for R. In relatively large-sized hollow-fiber filter modules, however, installation densities (R) higher than 0.60 tend to be undesirable even though the fastening member can properly function as a partition. More specifically, where the liquid to be treated is made to flow from the outside to the inside of the hollow fibers, the liquid may fail to reach the inner part of the bundle of hollow fibers, and where the liquid is made to flow from the outside to the inside of the hollow fibers, the liquid having passed through the hollow fibers located in the inner part of the bundle may fail to go out of the bundle of hollow fibers. Eventually, this may cause a reduction in the utilization efficiency of the hollow fibers located in the inner part of the bundle. Moreover, during the aforesaid gas bubble treatment, it becomes difficult for gas bubbles to penetrate into the inner part of the bundle of hollow fibers, so that only the hollow fibers located in the neighborhood of the outer surface of the bundle may be regenerated to restore their filtering function. These phenomena are marked especially in large-sized hollow-fiber filter modules in which the aforesaid internal cross-sectional area (Sr) is 10 cm$^2$ or larger. Where the internal cross-sectional area (Sr) is 30 cm$^2$ or larger, it is more preferable that R is not greater than 0.5.

On the other hand, the above-described problems do not arise when R is small. However, if R is unduly small, i.e. less than 0.11, the amount of water treated per hollow-fiber filter module decreases. This goes against the requirement for compact modules and causes a slight decrease in practical utility. As a result, it is desirable that R is not less than 0.2 and more preferably not less than 0.3.

Thus, since the hollow-fiber filter module of the present invention is provided with a hollow fiber retaining member, the U-shaped arrangement of the bundle of hollow fibers is not disturbed and the hollow fibers can be relatively uniformly bombarded with air bubbles, during the regeneration process for restoring the filtering function of the module by gas bubble treatment. Moreover, during the filtration process, the hollow fiber retaining member can prevent the hollow fibers from rising under the influence of the water current and can also protect the hollow fibers from excessive flexural fatigue. This permits the hollow-fiber filter module of the present invention to exhibit excellent performance when used in water purifiers.

Furthermore, if the hollow-fiber filter module of the present invention is constructed, as described above, in such a way that the installation density of the hollow fibers embedded in the annular member is not greater than a specified value, the liquid to be treated can easily reach the inner part of the bundle of hollow fibers when the liquid is made to flow from the outside to the inside of the hollow fibers, and the liquid having passed through the hollow fibers located in the inner part of the bundle can easily go out of the bundle of hollow fibers when the liquid is made to flow from the inside to the outside of the hollow fibers. This eventually improves the utilization efficiency of the hollow fibers as a whole. The hollow-fiber filter module of the present invention is further characterized in that, since gas bubbles can penetrate into the inner part of the bundle of hollow fibers during gas bubble treatment, the regeneration process for restoring the filtering function of the filter membrane by gas bubble treatment can be smoothly carried out by the gas bubble treatment without removing the module from the water purification equipment. Accordingly, the whole bundle of hollow fibers can function as a filter membrane over a long period of time, which permits the hollow-fiber filter module of the present invention to exhibit excellent performance when used in industrial-scale water purifiers.

The present invention is further illustrated by the following examples.

EXAMPLES 1-6

To an annular member having an internal diameter of 65 mm and a height of 70 mm were joined two supporting pillars measuring 740 mm in length, 20 mm in width and 5 mm in thickness. To the lower parts of these supporting pillars was fixed a hollow fiber retaining member having a diameter of 8 mm. Thus, there was obtained a supporting structure for a hollow-fiber filter module as shown in FIGS. 1a and 1b. In this supporting structure, a bundle of Polyethylene Hollow Fibers EHF (each having a cross-sectional area of 0.119 mm$^2$) was disposed in a U-shaped pattern so as to pass over the hollow fiber retaining member. Then, a fastening member made of a polyurethane resin was used to assemble a hollow-fiber filter module. The length of the U-shaped portion of each hollow fiber, which started from the fastening member and returned to the fastening member, was about 1,400 mm on the average. By varying the number of hollow fibers used as shown in Table 1, there were assembled a total of six hollow-fiber filter modules differing in the installation density (R) of the hollow fibers.

Each of these hollow-fiber filter modules was used to purify water containing iron ions and minute colloidal particles (about 8 μm in diameter) at a concentration of about 10 ppm. This purification process was continuously carried out for 15 days, during which time the amount of water treated per unit surface area of the hollow fibers was kept substantially constant. Thereafter, the aforementioned regeneration process by air bubble treatment was carried out for an hour. In the purification process, all of the hollow-fiber filter modules could purify the water to such an degree that the concentration of iron ions and other impurities was reduced to less than 0.5 ppb. However, as shown in Table 1, the changes in differential pressure with time varied according to the hollow-fiber filter module used. The changes in differential pressure with time of each hollow-fiber filter module are graphically shown in FIG. 9.

COMPARATIVE EXAMPLES 1-4

Using annular members of the same size as in Example 1, a total of four hollow-fiber filter modules were assembled in the same manner as in Example 1 except that neither supporting member nor hollow fiber retaining member was provided. In these hollow-fiber filter modules, the installation density (R) of the hollow fibers was altered by varying the number of hollow fibers used as shown in Table 1. When these hollow-fiber filter modules were tested in the same manner as in Example 1, the changes of differential pressure with time were small as shown in Table 1, compared to Examples 1-6 in which the hollow fiber retaining member was provided. However, after air bubble treatment some of the hollow fibers in each of the filter modules were bent or flatted. When each of the filter modules was tested again, leakage of colloid particles was observed.

EXAMPLES 7-10

A total of four hollow-fiber filter modules were assembled in the same manner as in Example 1 except that an annular hollow fiber retaining member similar to shown in FIG. 6 was used instead of the rod shaped hollow fiber retaining member. In these hollow-fiber filter modules, the installation density (R) of the hollow fibers was altered by varying the number of hollow fibers used as shown in Table 1. These hollow-fiber filter modules were also tested in the same manner as in Example 1. The results thus obtained are also shown in Table 1.

As a result, the rate of increase of differential pressure with time was small and the recovery of differential pressure after air bubble treatment was large compared to the results in Examples 1-6.

TABLE 1

| Example No. | Example 1 | Example 2 | Example 3 | Example 4 | Example 5 | Example 6 | Comparative Example 1 |
| --- | --- | --- | --- | --- | --- | --- | --- |
| Length of U-shaped portion (mm) | 1,400 | 1,400 | 1,400 | 1,400 | 1,400 | 1,400 | 1,400 |
| R = Sf/Sr | 0.10 | 0.21 | 0.31 | 0.39 | 0.50 | 0.61 | 0.31 |
| Number of hollow fibers used | 2,900 | 5,800 | 8,700 | 11,000 | 14,000 | 17,000 | 8,700 |
| Initial differential pressure (kg/cm$^2$) | 0.40 | 0.40 | 0.40 | 0.40 | 0.40 | 0.40 | 0.40 |
| Differential pressure after 10 days (kg/cm$^2$) | 0.95 | 0.96 | 0.96 | 1.10 | 1.60 | — | 0.96 |
| Differential pressure after backwashing (kg/cm$^2$) | 0.40 | 0.40 | 0.43 | 0.48 | 0.54 | 0.62[*2] | 0.40 |
| Curve No. in the graph of FIG. 9 | 1 | 1 | 1 | 2 | 3 | 4 | 1 |
| Water permeability per module[*1] | 0.22 | 0.45 | 0.67 | 0.85 | 1.09 | 1.32 | 0.67 |

| Example No. | Comparative Example 2 | Comparative Example 3 | Comparative Example 4 | Example 7 | Example 8 | Example 9 | Example 10 |
| --- | --- | --- | --- | --- | --- | --- | --- |

TABLE 1-continued

| | | | | | | | |
|---|---|---|---|---|---|---|---|
| Length of U-shaped portion (mm) | 1,400 | 1,400 | 1,400 | 1,400 | 1,400 | 1,400 | 1,400 |
| R = Sf/Sr | 0.39 | 0.51 | 0.61 | 0.31 | 0.39 | 0.50 | 0.61 |
| Number of hollow fibers used | 11,000 | 14,000 | 17,000 | 8,700 | 11,000 | 14,000 | 17,000 |
| Initial differential pressure (kg/cm$^2$) | 0.40 | 0.40 | 0.40 | 0.40 | 0.40 | 0.40 | 0.40 |
| Differential pressure after 10 days (kg/cm$^2$) | 1.04 | 1.20 | 1.50 | 0.96 | 1.10 | 1.55 | — |
| Differential pressure after backwashing (kg/cm$^2$) | 0.40 | 0.42 | 0.43 | 0.41 | 0.42 | 0.45 | 0.48*[2] |
| Curve No. in the graph of FIG. 9 | 5 | 6 | 7 | 1 | 8 | 9 | 10 |
| Water permeability per module*[1] | 0.85 | 1.09 | 1.32 | 0.67 | 0.85 | 1.09 | 1.32 |

*[1] Expressed in m$^3$/hr per module.
*[2] Backwashing was carried out after 7 days.

What is claimed is:

1. A hollow-fiber module comprising (a) an annular member, (b) a filter membrane consisting of a large number of hollow fibers, (c) a fastening member attached to the inside surface of said annular member for bundling and fixing said hollow fibers in a U-shaped attern with their both ends left open, (d) a supporting member consisting of a plurality of supporting pillars or a cylinder, said supporting member being joined to said annular member and extending along the U-shaped portions of said hollow fibers, and (e) a hollow fiber retaining means designed for holding all of said fibers from the bottom in a substantially fixed, parallel relationship sufficient to preclude entangling and flexural fatigue thereof, wherein said means is joined to said supporting member and extends through the space enclosed in the U-shaped portions of said hollow fibers.

2. The hollow-fiber filter module of claim 1 wherein, when said annular member is sectioned in a direction perpendicular to said hollow fibers, the ratio (R) of the cross-sectional area (Sf) occupied by said hollow fibers to the internal cross-sectional area (Sr) of said annular member satisfies the following condition:

$$0.11 \leq R \, (= Sf/Sr) \leq 0.06$$

3. The hollow-fiber filter module of claim 1 wherein said supporting member comprises a cylinder having an aperture in its side wall.

4. The hollow-fiber filter module of claim 1 or 3 wherein said hollow fiber retaining means is provided with a tubular spacer whose longitudinal axis is substantially parallel to said supporting member.

5. The hollow-fiber filter module of claim 1 or 3 wherein said hollow fiber retaining means has at least an annular part.

* * * * *